(12) United States Patent
Wiehler

(10) Patent No.: US 6,182,900 B1
(45) Date of Patent: *Feb. 6, 2001

(54) NETWORK-SUPPORTED CHIP CARD TRANSACTION METHOD

(75) Inventor: Gerhard Wiehler, Eichenau (DE)

(73) Assignee: Siemens Nixdorf Informationssysteme Aktiengesellschaft, Paderborn (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/041,815

(22) Filed: Mar. 12, 1998

(30) Foreign Application Priority Data

Mar. 12, 1997 (DE) .............................. 197 10 249

(51) Int. Cl.$^7$ .......................... G06K 19/06; G06F 17/00
(52) U.S. Cl. ......................... 235/492; 235/375; 705/17
(58) Field of Search .................. 235/492, 375, 235/379, 380; 902/22, 25, 26, 39; 705/16, 17, 21, 41

(56) References Cited

U.S. PATENT DOCUMENTS

| | | | |
|---|---|---|---|
| 4,709,137 | * 11/1987 | Yoshida | 235/379 |
| 4,736,094 | * 4/1988 | Yoshida | 235/379 |
| 4,823,388 | * 4/1989 | Mizutani et al. | 380/23 |
| 4,862,501 | * 8/1989 | Kamitake et al. | 380/50 |
| 4,961,142 | * 10/1990 | Elliot et al. | 364/408 |
| 5,036,461 | * 7/1991 | Elliot et al. | 364/408 |
| 5,497,411 | * 3/1996 | Pellerin | 379/59 |
| 5,530,232 | * 6/1996 | Taylor | 235/380 |
| 5,544,246 | * 8/1996 | Mandelbaum et al. | 380/23 |
| 5,679,945 | * 10/1997 | Renner et al. | 235/492 |
| 5,696,909 | * 12/1997 | Wallner | 395/244 |
| 5,844,218 | * 12/1998 | Kawan et al. | 235/380 |

* cited by examiner

Primary Examiner—Michael G Lee
Assistant Examiner—Daniel St. Cyr
(74) Attorney, Agent, or Firm—Schiff Hardin & Waite

(57) ABSTRACT

Terminals for the handling of payments are connectable to a plurality of transactors with transmission procedures that are protected against manipulation via an open data network, whereby the transactor is determined from the type of transaction. Chip cards, or smart cards, are used at the terminals for the transactions.

23 Claims, 2 Drawing Sheets

NETWORK-SUPPORTED CHIP CARD TRANSACTION METHOD

BACKGROUND OF THE INVENTION

1. Field of the Invention

The present invention is directed to methods and arrangements for electronic accounting of services, particularly by payments, with chip cards using open data networks.

2. Description of the Related Art

Cards with an embedded processor or memory, known as chip cards or smart cards, are employed for the payment of services. A number of different card types are known, these referred to being known as "credit cards", "debit cards", pre-paid money cards or as money cards with a refillable electronic purse.

There are currently money card solutions in many countries that are nationally developed and specific to each country; for example, "Avant" in Finland, "Danmont" in Denmark, the EC card with a chip in Germany, and "Quick" in Austria. These solutions are incompatible with one another in terms of technology and method of use.

Credit card organizations are currently testing solutions that are to be internationally employed, for example "Visa-cash" of Visa, "Mondex" of Mastercard, "Clip" of Europay, "Proton" of American Express. These solutions are likewise incompatible with one another. Even though this group of vendors has specified a common standard, which is currently known by the working title "EMV", cards that have already been issued and solutions that are already in the marketplace are not compatible with the new standard.

It has been shown that some of these cards definitely use largely the same hardware devices; they differ, however, on the basis of different software programs and protocols and specific security modules in the terminal for accepting the chip card. Accordingly, solutions have become known wherein a chip card terminal that the chip card uses during a payment procedure is equipped with a number of different software modules and to which several security modules are connected. Since it is expensive and inflexible, however, this solution is not suitable for broad area employment.

SUMMARY OF THE INVENTION

It is therefore an object of the present invention to provide a solution wherein a great number of different chip cards can be employed in a wide area without each terminal having to be equipped for all of these chip cards.

The present invention employs chip card terminals that are connected to an open data transmission network via which they can set up a manipulation-protected connection with various transactors, whereby the transactor is determined by the type of transaction, defined by the chip card.

DETAILED DESCRIPTION OF THE PREFERRED EMBODIMENTS

Figure 2:
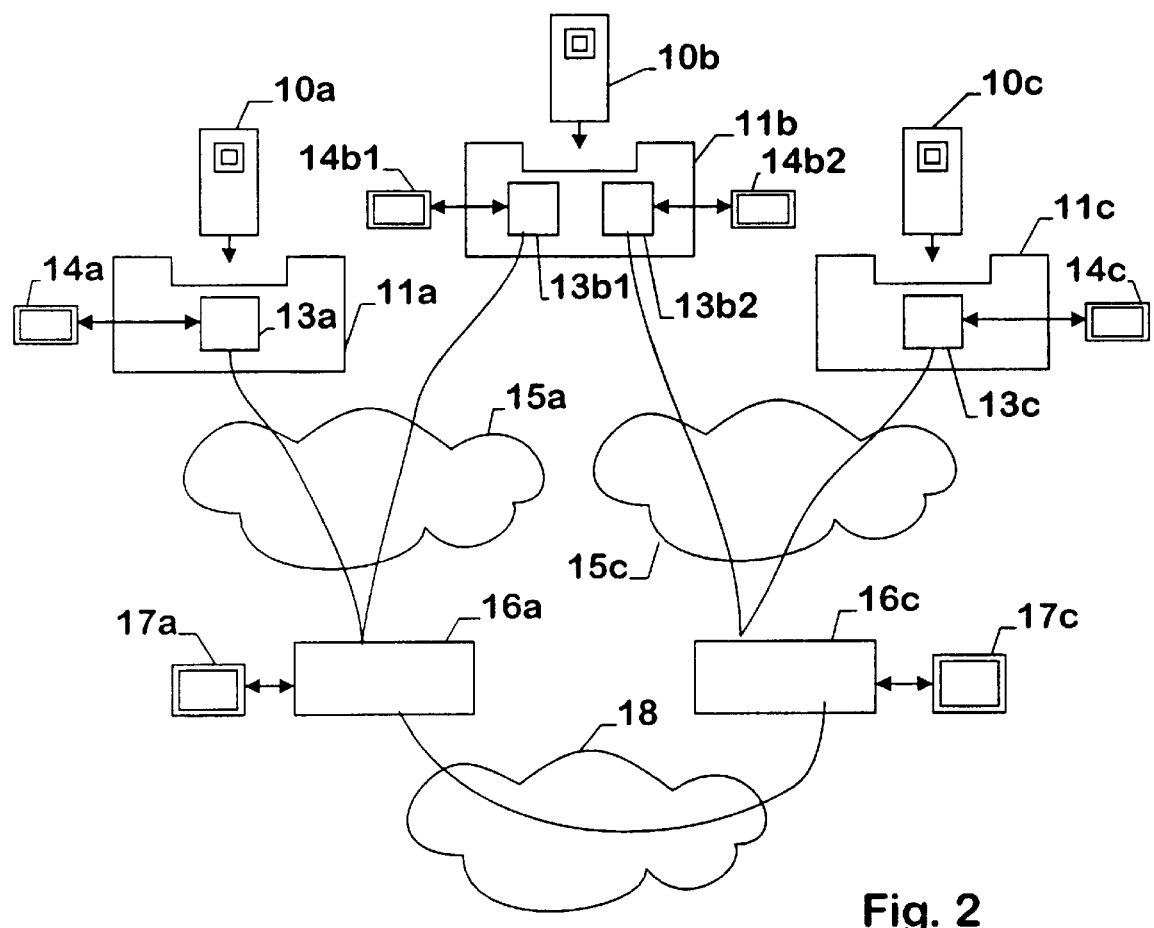
FIG. 2 is an illustration of the Prior Art corresponding to FIG. 1.

FIG. 2 shows a known arrangement for transaction implementation of payments with chip cards. In the following, "payments" refer to all types of transactions wherein value is attached to a dependable transaction. Chip cards such as, for example, those according to the standard ISO 7816-1, -2, -3 are utilized.

Chip cards $10a$, $10b$ and $10c$, also referred to as smart cards, are thereby connectable to terminals $11a$, $11b$ and $11c$. Each terminal contains a transactor $13a$, $13b1$, $13b2$ and $13c$ that is connected to respective security modules $14a$, $14b1$, $14b2$ and $14c$. The illustrated configuration refers to two payment networks $15a$ and $15c$ in which a host $16a$ and $16c$ in turn contains respective security modules $17a$ and $17c$, and the hosts can exchange transaction data with one another via a further network $18$. Instead of security modules, the hosts can also be operated in a secure environment with, for example, strict access control, and the codes can be deposited on standard data carriers. For example, the networks $15a$ and $15c$ are X25/Datex P-networks, which are usually connected as closed user groups. The terminal $11a$ is allocated to the host $16a$, while the terminal $11c$ is allocated to the host $16c$ and the terminals can therefore only implement methods that are supported by the host. As a rule, the respective transactor is specific for the vendor or, respectively, the service, which is also referred to below as type of transaction. In the present application, "hosts" also refer to hierarchic or meshed networks of computers for which the host represents the access and the interface.

Two transactors $13b1$ and $13b2$ that are connected to their own respective security modules $14b1$ and $14b2$ and have their own, dedicated network access to the respective networks $15a$ and $15c$ are therefore provided in the terminal $11b$ in order to make two different cards usable for the two different services.

As long as only a few terminals and a few services are present, the outlay of multiple transactors in a terminal is possible.

Figure 1:
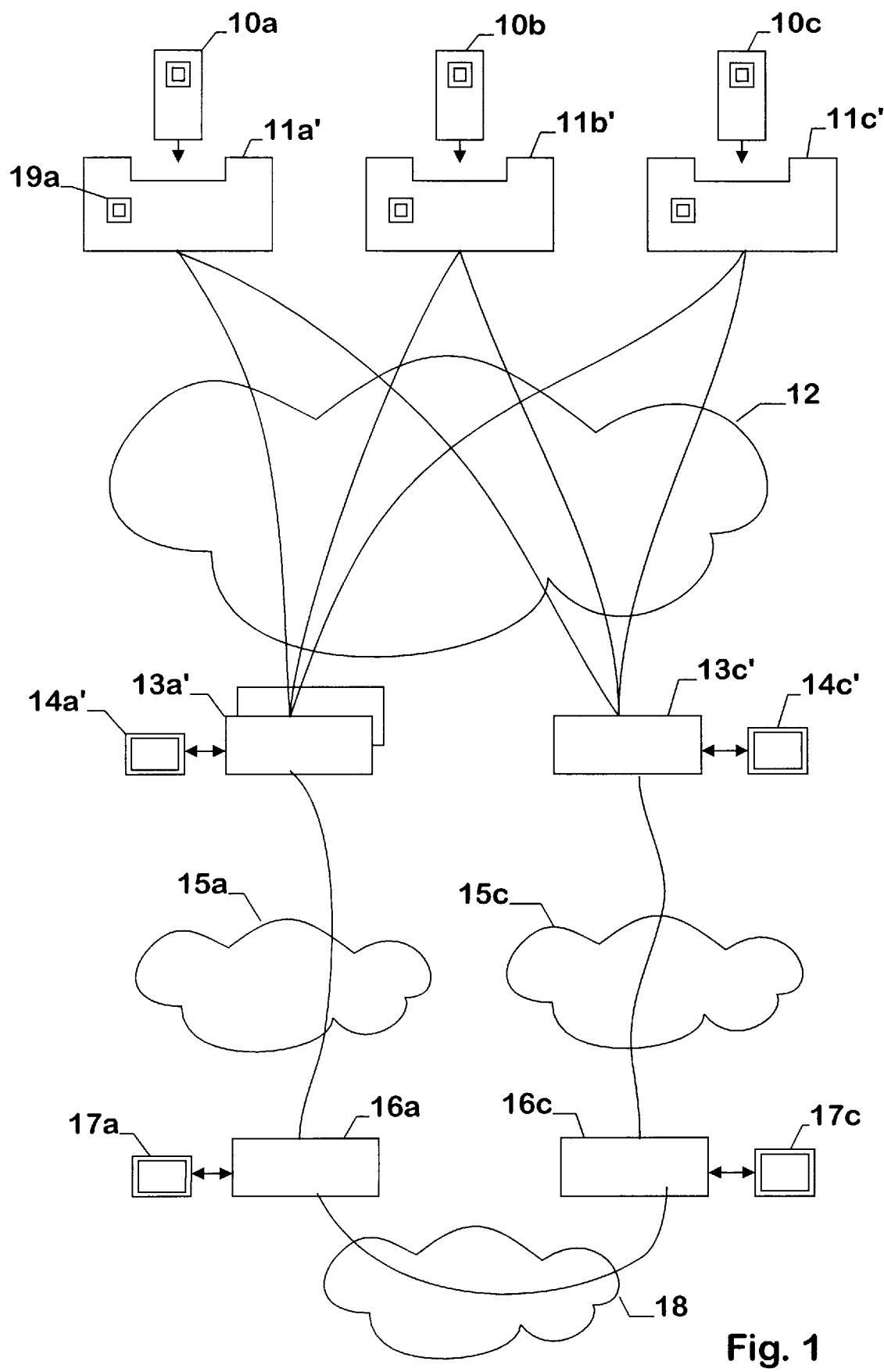
FIG. 1 is a schematic overview of the components in a transaction implementation with a chip card of the invention.

The present invention separates the transactor from the terminal which is arranged as shown in FIG. 1. The terminals $11a'$, $11b'$ and $11c'$ thereby contain no transactor of the previous type. An operating program, which is not separately shown, is merely present, this effecting the communication with the chip cards $10a$, $10b$ and $10c$ and serving for a secured connection to various transactors $13a'$ and $13c'$.

An open network $12$ assumes the data communication between the terminals $11a'$, $11b'$ and $11c'$ and the transactors $13a'$ and $13c'$ that in turn collaborate with the hosts $16a$ and $16c$ in a traditional way via specific networks $15a$ and $15c$. Additional chip card terminals of a known type can continue to be operated and can be additionally operated via these networks.

The network $12$ is preferably an open network as represented below by the Internet and the IP protocol family. As a result of the general availability and open architecture, it is possible for each of the terminals $11a'$, $11b'$ and $11c'$ to reach each of the transactors $13a'$ and $13c$, without further ado. As yet to be described in greater detail, each terminal can then reach each transactor and) thus, accept every chip card and implement transactions insofar as a suitable transactor can merely be reached in the network. It is also meaningful to provide a plurality of transactors at one location, as shown in FIG. 1 for the transactor $13a'$, because a plurality of terminals can access this and the one-time installation of only a single transactor is immediately available to all terminals.

The operating program in the terminal must thereby first determine the type of chip card, i.e. the service or, respectively, the transaction protocol to be applied, and, thus, must determine a possible transactor. This occurs by a readout from the chip card. Chip cards can also support a plurality of services; in this case, the terminal would have to ask the user with what service payment is to be made, insofar as this cannot be implicitly determined. Given a credit card with a refillable electronic purse, for example, amounts under DM 20 (20 Deutsch Marks) could always be debited from the purse and higher amounts from the credit card.

A "uniform resource locator" (URL), for example, is then formed from the identity of the desired service. This can be determined by a table in the terminal or by inquiry at a transactor. The employment of a URL is advantageous insofar as it makes a table in the terminal dispensable because the network functions then determine the closest transactor for this service. A URL for an American Express Gold credit card could then read "https://de.amexco.com/credit/gold/Hamburg"

whereby "https" identifies the protocol for the data communication between the terminal and the transactor. As can be seen from the example, both the location as well as the city can be coded in along with the computer name "de.amexco.com". Although the Internet address is potentially requested via the authorized name server of the center in the USA due to the encoding of the computer name, this can indicate a computer in Germany, so that a decentrally arranged transactor can be called despite a central name administration. The mere employment of a code for the transaction protocol in a computer name thus already offers a flexible form of connection from a terminal to a transactor.

A protocol which is protected against manipulations as well as intentional falsification or spying is thereby employed. An example of such a protocol family is contained in the draft "The SSL Protocol Version 3.0" by A. E. Freier, Ph. Karlton and P. C. Kocher, March 1996 that, for example, was capable of being called at the "Internet Engineering Task Force" (IEFT) on Mar. 10, 1997 under the URL ftp://ietf.cnri.reston.va.us/internet-drafts/draft-freier-ssl-version3-01.txt This protocol allows the employment of a number of cryptographic protocols and methods in order to secure the mutual authenticity and protect the transmitted data against manipulation and spying.

A security module 19a in which a secret key for the setup of the SSL connection that is unique and characteristic of the terminal is thereby preferably utilized in the terminal 11a'. In case of a symmetrical method, this secret key is stored in a known way in a security module of every transactor with which the terminal can communicate. However, asymmetrical methods are preferably employed wherein a private key is stored only in the security module of the terminal and the key derived therefrom is available to the transactors as what is referred to as a public key, and one must merely see to the authenticity thereof with one of the known measures. The security module in the terminal is thus primarily required for the protection of the connections to the transactors, whereas the security modules in the transactors also serve for the protection of the chip card transactions and the traditional key management connected therewith.

In a development of the invention, the security module of the terminal is used as a buffer memory for keys that are obtained together with program modules from a transactor. These program modules can then locally execute a transaction with the chip card upon employment of the key that is deposited in the security module. When it is a matter of a money card, then—as is standard given a money card—the amounts are deposited in the security module and transmitted cryptographically protected only at the end of the day. The transmission thereby preferably ensues to the transactor that transmitted the program module of the appertaining key or keys to the terminal via the protected network connection. A plurality of functionally identical transactors that are then to be considered as the same transactor in this sense can be provided for enhancing the performance.

Some card types can in fact locally execute the entire transaction, but a transaction set must be communicated to a central via a network after the end of the transaction. In this case, too, a program module can be communicated from the transactor and implemented in the terminal, which then sends the transaction set to its transactor. It can definitely be meaningful to transmit the program module togther with the key via the protected connection of the network for each transaction instead of individually transmitting the transaction steps. A waiting time then arises at most at the beginning or end of a transaction but not between the individual transaction steps, particularly in a datagram-oriented network like the Internet in which occasional delays cannot be precluded.

The program modules are thereby deposited on traditional bulk storage units, but are signed for protection against falsification and also potentially encrypted, whereby the matching key for checking the signature is also stored in the security module. The selection of the program modules occurs via the card type or, respectively, a code derived therefrom. The terminal and security module can thus be viewed as a buffer memory (or "cache"). In that, in particular, the security module at least partly serves as a buffer memory, a practically arbitrarily great number of chip cards can be employed with the terminal, and this number is dynamically expandable without requiring maintenance work at the terminal, like the adding of a further security module would mean.

The protocol "HTTP" or its secured version "HTTPS" thereby allows an especially simple possibility of buffering. The addition "if-modified-since" is provided in Section 10.9 in the document RFC 1945 by Bernes-Lee et al., issued May 1996, that describes HTTP/1.0. A document requested in this way is only transmitted when it is present in a newer version and can also be buffered to the intermediate stations. It is thus possible to package, encipher and sign a program module together with the required key and to provide it with a network name that is identified by a URL. Upon introduction of the chip card, the operating program determines a URL via the code of the card type, adds the date of the existing, buffered version thereto and sends a request to the transactor. When the buffered version is current, only the answer code "304" is transmitted and the buffered version is used. Otherwise, the transmitted version is unpacked, deposited and executed.

In a further version, program modules and keys can also already be deposited in the terminal before the installation as though they had been transmitted via a network connection and buffered. This is a possibility for reducing the network load for applications that are known to be frequently or predominantly used. An indicator in the buffer memory management can also identify these entries such that a displacement in the buffer memory should be avoided or completely suppressed. The respective inquiry by the transactor defined by the chip card as to whether a new version is extant thereat is not affected by this and potentially replaces the pre-stored version.

As described, the program module together with one or more keys is preferably transmitted into the terminal from the transactor. However, it is also possible to separately administer and manipulate program modules and keys when, for example, the network load that is increased as a result thereof is counterbalanced by increased flexibility.

As a result of the calculating performance in a terminal that is increased as compared to the limitations of the chip card, this not being established in the chip that have hitherto been issued and should continue to be employed, public key methods can now also be utilized for the protection of the data communication, particularly the authentification and generation of session keys. Further particulars with respect thereto can also be derived from the SSL document and the references cited therein. For example, certificates according to the standard X509.3 can serve for the certification of public keys.

The security module can be implemented as a chip card or as a SIM module which is known from GSM mobile telephones. Customized versions are also possible, for example on the basis of the chip SL 44CR80S of Siemens AG.

After the secured connection is set up between the terminal and the transactor, the operating program mediates the communication between the transactor and the chip card. In most instances, data blocks are converted into the protocol of the network connection by the operating program and communicated transparently. In many instances, however, a communication with a user, say the owner of the chip card, is required so he or she can be shown the value of the transaction and can subsequently confirm the transaction. To this end, input and output devices such as a keyboard and a display are provided at the terminal. These are made available to the transactor via the secured connection, since only the transactor possesses the authentic value for the transaction. Alternatively, the operating program can determine these data from the communication between the chip card and the transactor and display them on its Own and communicate the confirmation to the transactor.

A personal computer that is equipped with a read means for chip cards can also serve as terminal. The operating program of the terminal is executed on the processor of the PC and thus additionally has access to the picture screen and the keyboard. A payment procedure can thus be initiated, particularly given an interactive dialogue, for example via an access to the Internet and the World Wide Web. It is thereby especially advantageous that the invention can employ the same data network for the communication between the chip card and the transactor that is already used for the interactive dialogue, namely the Internet. The read means for the chip card used for the payment preferably contains its own processor and a security module, preferably in the form of a further built-in chip card. The processor on the read means assumes the communication tasks between the chip card and the transactor and turns to the processor of the personal computer for dialogues with the user.

Insofar as the security level that can thus be achieved is acceptable for the user of a personal computer, a separate security module and a processor on the read means can be foregone. This is the case when the PC is not generally accessible but is available to only a few known persons and a falsification of the Operating program need not be feared, as for example in the dwelling of a private user. A permanent secret key can also be entirely foregone for the manipulation protection of the communication with the transactor in that session keys, for example for the communication, are formed according to the method of Diffie and Hellmann. Depending on the application, it is conceivable that the authenticity of the terminal is not inevitable for the transactor, since the actual transactions are carried out with the chip card.

Instead of specific terminals, for example in combination with purses or personal computers, a terminal of the invention can also be integrated into an automatic goods or services unit, including information terminals. For example, the selection key for the goods and the dispenser mechanism for the selected goods are then input and output units.

It is also conceivable that chip cards are issued that contain the generation of session keys for a secured Internet connection according to, for example, the SSL protocol as a further application. Neither a separate processor nor a security module is then required on personal computers on the read means for chip cards.

While not shown in FIG. 1, each host 16a and 16c can also be connected to the public data network 12 and directly support the transactor function, insofar as security considerations do not rule against this.

A particular advantage of the invention is comprised therein that only the transactors need be adapted or, respectively, additional transactors need be made available; the networks 15a and 15c for the transaction implementation and the host applications 16a and 16c can remain unmodified and, thus, the previous applications can continue to be operated unmodified.

Since a terminal, in addition to being equipped with a chip card reader, can also be equipped with a magnetic card reader or, respectively, a combination reader, the operating program is expanded to such an effect in a development that it can transmit the data of the magnetic track and potentially existing security features to the transactor. The previous methods based on a magnetic card can thus continue to be used. This is also true of chip cards without a processor that allow a memory to be read and written. The number of transactors in the network can be reduced to the extent that these cards are taken out of circulation.

A security advantage derives in that the secret keys required for the transaction implementation no longer have to be stored in the terminal. Hitherto, this led to the fact that terminals were specially protected when publicly installed in order to discourage any attack on the security module from the very outset A successful attack on a security module that only relates to the communication between the terminal and the transactor has less serious consequences than one on a traditional security module. The transactors can also run as processes on high-performance computers, so that an especially fast reaction is possible and a plurality of transactors can used a shared, fast security module in common.

Although other modifications and changes may be suggested by those skilled in the art, it is the intention of the inventor to embody within the patent warranted hereon all changes and modifications as reasonably and properly come within the scope of their contribution to the art

I claim:

1. A method for executing transactions that are protected by a chip card, comprising the steps of:

connecting one chip card of a plurality of possible types of chip cards to a terminal;

determining a code for a transaction procedure according to which the transaction is to be carried out, the code being determined by an operating program in the terminal after the one chip card is connected to the terminal;

determining a network address of a corresponding transactor of a plurality of transactors from the code of the transaction procedure, said corresponding transactor corresponding to said one chip card;

setting up a connection from said terminal to the corresponding transactor through a data network by the operating program, said connection being protected by cryptographic methods; and subsequently implementing the transaction by bi-directional communication between the chip card and the corresponding transactor;

connecting said corresponding transactor to a host;

providing a security module in said corresponding transactor; and providing a secure transaction between said corresponding transactor and said host using said security module.

2. A method according to claim 1, further comprising the step of:

using input and output units connected to the terminal for the corresponding transactor of said plurality of transactors due to the data connection between the terminal and the transactor.

3. A method according to claim 2, further comprising the steps of:

prompting the user to input a secret character string by the operating program of the terminal prompts;

checking the secret character against a reference value; and transmitting only a result of the checking step to the corresponding transactor of said plurality of transactors via the connection protected by cryptographic methods.

4. A method according to claim 1, further comprising the steps of:

using protected keys of at least one directly connected security module both for protection of the connection with the terminal as well as for protection of the transactions with the chip card by the corresponding transactor of said plurality of transactors.

5. A method according to claim 4, wherein the terminal employs protected keys of a directly connected security module for protection of the connection with the corresponding transactor of said plurality of transactors.

6. A method according to claim 5, further comprising the step of:

using an application of the chip card and a key stored protected in the chip card employed for protection of the connection between said terminal and said corresponding transactor of said plurality of transactors.

7. A method according to claim 5, further comprising the step of:

transmitting a key from the corresponding transactor of said plurality of transactors into the directly connected security module with the connection, said key serving for the protected execution of at least a part of a transaction with the chip card.

8. A method according to claim 7, further comprising:

depositing the keys in the terminal in a buffer memory, and using the keys deposited in the buffer memory instead of a renewed transmission of the keys.

9. A method according to claim 8, further comprising the steps of:

checking whether a key in the buffer memory is current by an inquiry at the corresponding transactor of said plurality of transactors before a use of the key in the buffer memory, and transmitting a current version of the key if warranted.

10. A method according to claim 1, further comprising the step of:

using a TCP/IP protocol for the connection of the terminal and the corresponding transactor of said plurality of transactors.

11. A method according to claim 10, wherein said TCP/IP protocol is the protocol SSL.

12. A method according to claim 1, wherein said corresponding transactor is allocated to said terminal, and further comprising the step of:

inquiring at said corresponding transactor of said plurality of transactors for determining a network address of a further transactor which is suitable for the transaction procedure.

13. A method according to claim 1, further comprising the step of:

using said code of the transaction procedure as part of a symbolic network address that is resolved by servers belonging to the network for determination of network addresses of a further transactor of said plurality of transactors suitable for the transaction procedure.

14. A method according to claim 1, further comprising the steps of:

transmitting a program module with the connection from the corresponding transactor of said plurality of transactors to the terminal; and executing the program module at the terminal.

15. A method according to claim 14, further comprising:

depositing the program modules in the terminal in a buffer memory, and using the program modules deposited in the buffer memory instead of a renewed transmission of the program modules.

16. A method according to claim 15, further comprising the steps of:

checking whether a program module in the buffer memory is current by an inquiry at the corresponding transactor of said plurality of transactors before a use of the program module in the buffer memory, and transmitting a current version of the program module if warranted.

17. A method for executing transactions that are protected by a chip card connectable to a terminal that is connected to a data network, comprising the steps of:

determining a code for a transaction procedure according to which the transaction is to be carried out, the code being determined by an operating program in the terminal after the chip card is connected to the terminal;

determining a network address of a transactor from the code of the transaction procedure, setting up a connection to the transactor by the operating program, said connection being protected by cryptographic methods;

subsequently implementing the transaction by communication between the chip card and the transactor;

transmitting a program module with the connection from the transactor to the terminal; and executing the program module at the terminal;

depositing the program modules in the terminal in a buffer memory;

using the program modules deposited in the buffer memory instead of a renewed transmission of the program modules;

checking whether a program module in the buffer memory is current by an inquiry at the transactor before a use of the program module in the buffer memory;

transmitting a current version of the program module if warranted; and using a protocol selected from the group of protocols consisting of HTTP and HTTPS for the step of checking whether the program module is current.

18. A method for executing transactions that are protected by a chip card connectable to a terminal that is connected to a data network, comprising the steps of:
- determining a code for a transaction procedure according to which the transaction is to be carried out, the code being determined by an operating program in the terminal after the chip card is connected to the terminal;
- determining a network address of a transactor from the code of the transaction procedure, setting up a connection to the transactor by the operating program, said connection being protected by cryptographic methods;
- subsequently implementing the transaction by communication between the chip card and the transactor;
- using protected keys of at least one directly connected security module both for protection of the connection with the terminal as well as for protection of the transactions with the chip card by the transactor;
- wherein the terminal employs protected keys of a directly connected security module for protection of the connection with the transactor;
- transmitting a key from the transactor into the directly connected security module with the connection, said key serving for the protected execution of at least a part of a transaction with the chip card;
- depositing the keys in the terminal in a buffer memory;
- using the keys deposited in the buffer memory instead of a renewed transmission of the keys;
- checking whether a key in the buffer memory is current by an inquiry at the transactor before a use of the key in the buffer memory;
- transmitting a current version of the key if warranted; and
- using a protocol selected from the group of protocols consisting of HTTP and HTTPS for the step of checking whether the key is current.

19. An arrangement for execution of transactions that are protected by a chip card connectable to a terminal that is connected to a data network having a means for address formation, comprising:
- a terminal including a means for determining a code for a transaction method to be employed with a connection of the chip card to the terminal, said terminal receiving at least one chip card of a plurality of types of chip cards;
- a plurality of transactors reachable via the data network being addressed from the code based of the means for address formation, said plurality of transactors including a corresponding transactor corresponding to a transaction type of said one chip card;
- a connection means in said terminal for setting up a connection to the corresponding transactor;
- devices with which the connection between the terminal and the corresponding transactor can be secured against manipulations being in the terminal and the corresponding transactor; and
- devices in the corresponding transactor that allow transactions including bi-directional communications with the chip card to be executed secured upon mediation of the terminal.

20. An arrangement according to claim 19, further comprising:
- output devices in the terminal that can be used by the corresponding transactor of said plurality of transactors over the network during execution of the transaction.

21. Arrangement according to claim 19, further comprising:
- at least one means in the corresponding transactor for secure storing of cryptographic keys as well as for the protection of the connection to an operating program of the terminal as well as for the protection of the transaction with the chip card.

22. An arrangement according to claim 21, further comprising:
- a means in the terminal for secure storing of keys for protection of the connection with the corresponding transactor of said plurality of transactors.

23. An arrangement according to claim 22, further comprising:
- a means in the one chip card for generating a session key in the terminal for protection of the connection between the terminal and the corresponding transactor of said plurality of transactors.

* * * * *